H. G. BARR.
AUTOMATIC REVERSING MECHANISM FOR DRILLS AND THE LIKE.
APPLICATION FILED JAN. 21, 1910.
961,334.
Patented June 14, 1910.
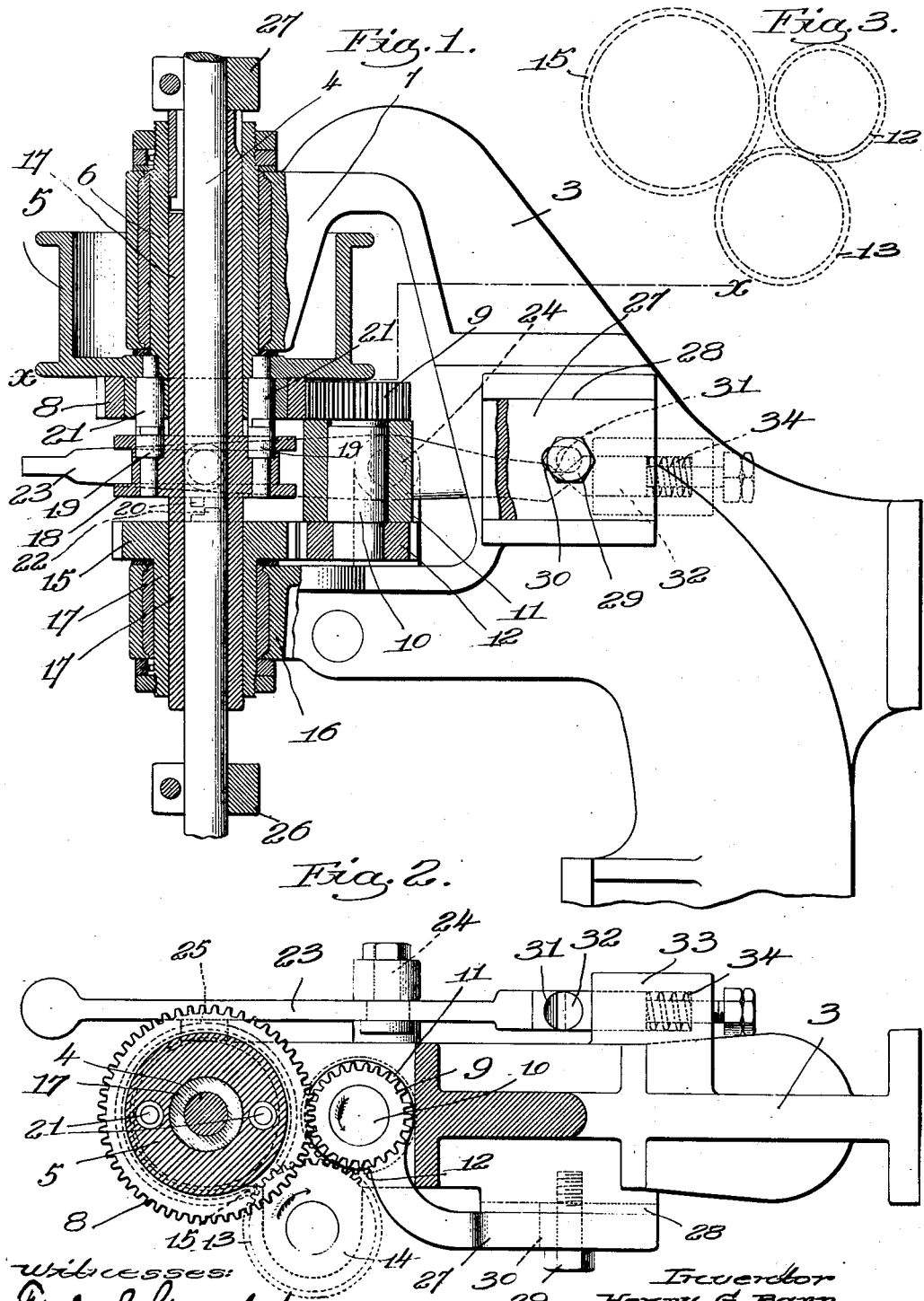

UNITED STATES PATENT OFFICE.

HENRY G. BARR, OF WORCESTER, MASSACHUSETTS.

AUTOMATIC REVERSING MECHANISM FOR DRILLS AND THE LIKE.

961,334.  Specification of Letters Patent.  Patented June 14, 1910.

Application filed January 21, 1910. Serial No. 539,409.

*To all whom it may concern:*

Be it known that I, HENRY G. BARR, a citizen of the United States, residing at Worcester, county of Worcester, and State of Massachusetts, have invented an Improvement in Automatic Reversing Mechanism for Drills and the Like, of which the following description, in connection with the accompanying drawing, is a specification, like characters on the drawing representing like parts.

This invention has for its object to provide a novel reversing mechanism which is especially adapted to be used for reversing the direction of rotation of a drill shaft, although the invention is of such a nature that it might be used in a great variety of places where the direction of rotation of a shaft is desired to be reversed. Where the device is applied to a drill, it constitutes a tapping attachment by which when the drill is used for tapping, the direction of rotation of the drill shaft will be automatically reversed when the tap has been fed into the work to the desired depth thereby causing the tap to back out of the work. The device is adjustable so that it is possible to secure the reverse at any desired point.

I will first describe one embodiment of my invention and then point out the novel features thereof in the appended claims.

Referring to the drawings, Figure 1 is a side view of a drill head having my improved reverse mechanism thereon, the reverse mechanism being shown in vertical section; Fig. 2 is a horizontal section on the line X—X, Fig. 1; Fig. 3 is a plan view of a portion of the reversing gears.

The head or upper portion of the frame of the drilling machine is shown at 3 and as my improved reversing mechanism is located on the head, I have not deemed it necessary to illustrate the entire drill frame or the bed. The drill shaft is shown at 4 and this is designed to carry at its lower end the usual chuck adapted to sustain the drill or tap. This drill shaft is arranged to rotate and also to have a vertical movement as usual.

5 designates a driving pulley around which a belt (not shown) passes and through which the rotary movement is given to the drill shaft, said pulley being supported on a hub or journal 6 that is rotatably mounted in the arm 7 of the head 3.

My improved reversing mechanism is arranged to rotate the drill shaft or spindle in either direction from the driving pulley 5 and the construction is such that the reversing mechanism will be operated to reverse the direction of rotation of the spindle by longitudinal movement thereof. As herein shown, the pulley 5 has rigid therewith a gear 8 which meshes with and drives a gear 9 carried by the upper end of a stud or shaft 10 which is journaled in a suitable bearing 11 and on the lower end of said stud or shaft 10 is a gear 12 which meshes with an idler 13 that is journaled on a stud set rigidly in a bearing 14 carried by the frame and that meshes with a driven gear 15 which is journaled in a bearing formed in the arm 16 of the head and which is concentric with the spindle 5. With this arrangement of gearing, it will be observed that the gear 15 will be driven in an opposite direction from the gear 8 or driving pulley 5.

I have provided a clutch device adapted to clutch the spindle 4 either to the driving pulley 5 or to the driven gear 15 so that the spindle will be driven in one direction or the other depending on the position of the clutch. I have also provided means whereby this clutch may be operated by the longitudinal movement of the spindle 4. As herein shown, the spindle 4 has splined thereto a sleeve 17 which passes through the driven gear 15 and the hub or journal 6 and on which said gear and hub are loosely mounted. This sleeve has the collar 18 thereon which is provided with means to be clutched either to the pulley 5 or to the driven gear 15. While any suitable clutch construction might be employed, that herein shown consists of clutch pins 19, 20 carried by the collar and adapted to engage other clutch pins 21, 22 carried by the pulley 5 and the gear 15 respectively. The collar 18 is grooved and a lever 23 pivoted to the frame at 24 is provided with a lug 25 adapted to enter the groove so that the clutch may be operated by hand. The spindle 4 carries two adjustable collars 26, 27, one below and the other above the sleeve 17.

The operation of the device as thus far described is as follows: When the clutch is in the position shown in the drawings, the spindle will be clutched directly to and will be driven by the driving pulley 5 and will be unclutched from the driven gear 15. If we assume that the drill is being used for tapping purposes, then the collar 27 will be so adjusted as to engage the end of the sleeve 17 when the tap has reached the lowest point desired in the work which is the position shown in Fig. 1. When the collar does engage the sleeve it will shift the sleeve downwardly thereby unclutching said sleeve from the driving pulley 5 and clutching it to the driven gear 15. Since the driven gear 15 is rotating in the opposite direction from the driving pulley, the direction of rotation of the spindle will be reversed and the tap will be backed out of the work. The collar 26 is so adjusted on the spindle that when the tap has been elevated, sufficiently above the work, said collar will engage the lower end of the sleeve 17 thereby elevating said sleeve and disconnecting it from the driven gear and reëngaging it with the driving pulley 5.

In order to insure that the sleeve 17 will be thrown the full distance whenever it is shifted by the collars, I have provided a spring actuator adapted to act on the lever 23 when the latter has passed its central position and to complete the throw of the lever. As herein shown, the end of the lever is beveled or V-shaped, as shown at 31 and it is acted on by a spring-pressed plunger or actuator 32, the end of which is also V-shaped. This plunger is slidably mounted in a guide 33 and is acted on by a suitable spring 34 that tends to throw it forward. When the sleeve 17 is moved in either direction and consequently the lever 23 is turned, the initial movement of the lever will crowd the plunger backwardly, but when the lever passes its central position so that the point thereof passes the point of the plunger, the spring 34 will force the plunger forwardly causing it to act on the end of the lever 23 and complete its movement, thus insuring that the clutch will be completely thrown.

The reversing mechanism is so arranged that it can be thrown out of operation whenever it is not needed, and I accomplish this herein by mounting the stud 10 on a sliding bracket 27 which is supported by the frame, but can be moved thereon sufficiently to withdraw the gears 9 and 12 from mesh with the gears 8 and 13. As herein shown, the drill head 3 is provided on one side with the ways 28 in which the bracket 27 is slidably received, and said bracket is held in position by the cap-screw 29. The bracket is provided with a slot 30 through which the screw passes, and which permits sufficient movement of the bracket 27 to disengage the gears as above described. When the gears are thus disengaged, the reversing mechanism is thrown out of operation.

My invention as applied to a drill constitutes an automatic tapping attachment by means of which the tap may be turned in either direction to advance it into the work or withdraw it therefrom. If, however, it is not desired to use the tapping attachment, the bracket 27 can be easily shifted so as to render the reversing mechanism inoperative.

It will be noted that the shaft or spindle 4 is a power-conveying shaft, that is, one which conveys power to the tool or other part to be operated, and my invention, therefore, contemplates a construction in which the reversing operation is accomplished by the longitudinal movement of the power-conveying shaft.

While the construction herein illustrated is especially useful as a tapping attachment for drills, yet it will be obvious that it might be used in other relations where it is desired to reverse the rotation of a shaft which has a longitudinal movement as well as a rotary movement, and by a proper modification of the construction, the device may be used for reversing a shaft that does not have a longitudinal movement.

Having fully described my invention, what I claim as new and desire to secure by Letters Patent is:—

1. In an automatic reversing mechanism, the combination with a rotary power conveying spindle or shaft capable of longitudinal movement, of a driving member and a driven member, both loosely surrounding the shaft, means to rotate the driven member from the driving member but in an opposite direction, and means operated by a longitudinal movement of the shaft to clutch the latter either to the driving or driven member.

2. In an automatic reversing mechanism, the combination with a rotary spindle or shaft capable of longitudinal movement, of a sleeve splined to the spindle, two oppositely-rotating members loosely mounted on the sleeve, means to clutch said sleeve to either member by a longitudinal movement thereof, and means to give said sleeve its longitudinal movement by a longitudinal movement of the spindle.

3. In an automatic reversing mechanism, the combination with a rotary spindle or shaft capable of longitudinal movement, of a sleeve splined to the spindle, two oppositely-rotating members loosely mounted on the sleeve, means to clutch said sleeve to either member by a longitudinal movement thereof, and collars on the spindle to engage the sleeve and thereby move the latter longitudinally.

4. In a tapping attachment for drills, the combination with a longitudinally-movable drill shaft adapted to support and operate a drill, of a driving pulley surrounding the same, a driven gear concentric with the drill shaft, means to rotate the driven gear from the driving pulley, but in a reverse direction, and automatic means operated by longitudinal movement of the drill shaft to clutch said shaft either to the driving pulley or to the driven gear.

5. In a tapping attachment for drills, the combination with a drill head, of a longitudinally-movable drill shaft supported thereby, a driving pulley, a driven gear, a bracket carried by said head, and gearing sustained by the bracket and adapted to connect the driving pulley to the driven gear whereby the latter will be rotated from the former but in an opposite direction, and means operated by the longitudinal movement of said drill shaft to connect the latter to either the driven gear or the driving pulley.

6. In a tapping attachment for drills, the combination with a drill head, of a longitudinally-movable drill shaft supported thereby, a driving pulley, a driven gear, a bracket adjustably carried by the drill head, gearing sustained by the bracket and adapted in one position to connect the driving pulley to the driven gear thereby to rotate the latter in a direction opposite to the driving pulley and in another position to disconnect said driven gear from the driving pulley, and means operated by longitudinal movement of the drill shaft to clutch the latter either to the driving pulley or to the driven gear.

In testimony whereof, I have signed my name to this specification, in the presence of two subscribing witnesses.

H. G. BARR.

Witnesses:
A. BENJ. NYSTROM,
L. E. HINCKEL.